(12) United States Patent  
McMillen

(10) Patent No.: US 6,619,739 B2
(45) Date of Patent: Sep. 16, 2003

(54) UNIVERSAL ERGONOMIC SUPPORT WITH SELF-CONTAINED ACTUATOR

(75) Inventor: Robert James McMillen, Tecumseh (CA)

(73) Assignee: L & P Property Management Company, South Gate, CA (US)

( * ) Notice: Subject to any disclaimer, the term of this patent is extended or adjusted under 35 U.S.C. 154(b) by 0 days.

(21) Appl. No.: 09/798,657

(22) Filed: Mar. 1, 2001

(65) Prior Publication Data

US 2002/0121802 A1 Sep. 5, 2002

(51) Int. Cl.⁷ .................................................. A47C 7/46
(52) U.S. Cl. ................................. 297/284.7; 297/284.4
(58) Field of Search ............................ 297/284.7, 284.4

(56) References Cited

U.S. PATENT DOCUMENTS

| | | | |
|---|---|---|---|
| 1,182,854 A | 5/1916 | Poler | |
| 2,756,809 A | 7/1956 | Endresen | 155/182 |
| 2,843,195 A | 7/1958 | Barvaeus | 155/182 |
| 2,942,651 A | 6/1960 | Binding | 155/131 |
| 3,378,299 A | 4/1968 | Sandor | 297/284 |
| 3,490,084 A | 1/1970 | Schuster | 5/351 |
| 3,492,768 A | 2/1970 | Schuster | 52/98 |
| 3,724,144 A | 4/1973 | Schuster | 52/108 |
| 3,762,769 A | 10/1973 | Poschl | 297/284 |
| 3,880,463 A * | 4/1975 | Shephard | 297/284.7 |
| 4,014,422 A | 3/1977 | Morishita | 192/67 |
| 4,136,577 A | 1/1979 | Borgersen | 74/479 |
| 4,153,293 A | 5/1979 | Sheldon | 297/284 |
| 4,156,544 A | 5/1979 | Swenson et al. | 297/284 |
| 4,182,533 A * | 1/1980 | Arndt et al. | 297/284.4 |
| 4,295,681 A * | 10/1981 | Gregory | 297/284.4 |
| 4,313,637 A | 2/1982 | Barley | 297/284 |
| 4,316,631 A | 2/1982 | Lenz et al. | 297/284 |
| 4,354,709 A | 10/1982 | Schuster | 297/284 |
| 4,390,210 A | 6/1983 | Wisniewski et al. | 297/452 |
| 4,449,751 A | 5/1984 | Murphy et al. | 297/284 |
| 4,452,485 A | 6/1984 | Schuster | 297/284 |
| 4,465,317 A | 8/1984 | Schwarz | 297/284 |
| 4,494,709 A | 1/1985 | Takada | 242/107.6 |
| 4,541,670 A | 9/1985 | Morgenstern et al. | 297/284 |
| 4,555,140 A | 11/1985 | Nemoto | 297/452 |
| 4,556,251 A | 12/1985 | Takagi | 297/284 |
| 4,561,606 A | 12/1985 | Sakakibara et al. | 242/107 |
| 4,564,235 A * | 1/1986 | Hatsutta et al. | 297/284.4 |
| 4,565,406 A | 1/1986 | Suzuki | 297/284 |
| 4,576,410 A | 3/1986 | Hattori | 297/284 |
| 4,601,514 A | 7/1986 | Meiller | 297/284 |
| 4,602,819 A | 7/1986 | Morel | 297/460 |
| 4,627,661 A | 12/1986 | Ronnhult et al. | 297/284 |
| 4,632,454 A | 12/1986 | Naert | 297/284 |
| 4,676,550 A | 6/1987 | Neve De Mevergnies | 297/353 |
| 4,679,848 A | 7/1987 | Spierings | 297/284 |
| 4,730,871 A | 3/1988 | Sheldon | 297/230 |
| 4,880,271 A | 11/1989 | Graves | 257/284 |
| 4,909,568 A | 3/1990 | Dal Monte | 292/284 |
| 4,915,448 A | 4/1990 | Morgenstern | 297/284 |

(List continued on next page.)

FOREIGN PATENT DOCUMENTS

| | | | |
|---|---|---|---|
| AT | 401 497 | 9/1996 | B60N/2/22 |
| DE | 2040794 | 7/1971 | A47C/7/28 |
| DE | 206 4419 | 7/1972 | B60N/1/06 |

(List continued on next page.)

Primary Examiner—Rodney B. White
(74) Attorney, Agent, or Firm—Grant D. Kang, Esq.; Robert C. Haldiman, Esq.

(57) ABSTRACT

An ergonomic weight support device for a seat comprising a housing having a channel defined by at least one guide boss, an extending element having an unanchored weight supporting end and an engaged end slidingly disposed within the channel of said housing and an actuator fixedly attached to said housing and in moving communication with said extending element whereby said actuator mediates the weight supporting end of said extending element between a substantially retracted position and an extended position.

14 Claims, 17 Drawing Sheets

U.S. PATENT DOCUMENTS

| | | | |
|---|---|---|---|
| 4,950,032 A | 8/1990 | Nagasaka | 297/284 |
| 4,957,102 A | 9/1990 | Tan et al. | 128/68 |
| 4,968,093 A | 11/1990 | Dal Monte | 297/284 |
| 5,005,904 A | 4/1991 | Clemens et al. | 297/284 |
| 5,022,709 A | 6/1991 | Marchino | 297/452 |
| 5,026,116 A | 6/1991 | Dal Monte | 297/284 |
| 5,050,930 A | 9/1991 | Schuster et al. | 257/284 |
| 5,076,643 A | 12/1991 | Colasanti et al. | 297/284 |
| 5,088,790 A | 2/1992 | Wainwright et al. | 297/284 |
| 5,112,106 A * | 5/1992 | Asbjornsen | 297/284.7 |
| 5,137,329 A | 8/1992 | Neale | 297/284 |
| 5,174,526 A | 12/1992 | Kanigowski | 244/122 |
| 5,186,412 A | 2/1993 | Park | 242/245 |
| 5,197,780 A | 3/1993 | Coughlin | 297/284.7 |
| 5,215,350 A | 6/1993 | Kato | 297/284 |
| 5,217,278 A | 6/1993 | Harrison et al. | 297/284.7 |
| 5,286,087 A | 2/1994 | Elton | 297/284.7 |
| 5,299,851 A | 4/1994 | Lin | 297/284.5 |
| 5,328,236 A | 7/1994 | Mizushima et al. | 297/284.9 |
| 5,335,965 A | 8/1994 | Sessini | 297/284.4 |
| 5,385,531 A | 1/1995 | Jover | 601/99 |
| 5,397,164 A | 3/1995 | Schuster et al. | 297/284.1 |
| 5,423,593 A | 6/1995 | Nagashima | 297/284.5 |
| 5,449,219 A | 9/1995 | Hay et al. | 297/284.4 |
| 5,452,868 A | 9/1995 | Kanigowski | 244/122 R |
| 5,466,045 A | 11/1995 | Akima | 297/284.8 |
| 5,474,358 A | 12/1995 | Maeyaert | 297/284.7 |
| 5,498,063 A | 3/1996 | Schuster et al. | 297/284.1 |
| 5,518,294 A | 5/1996 | Ligon, Sr. et al. | 297/284.4 |
| 5,553,917 A | 9/1996 | Adat et al. | 297/230.14 |
| 5,562,324 A | 10/1996 | Massara et al. | 297/284.6 |
| 5,567,010 A | 10/1996 | Sparks | 297/284.4 |
| 5,567,011 A | 10/1996 | Sessini | 297/284.4 |
| 5,588,703 A | 12/1996 | Itou | 297/284.4 |
| 5,609,394 A | 3/1997 | Ligon, Sr. et al. | 297/284.4 |
| 5,626,390 A | 5/1997 | Schuster et al. | 297/284.1 |
| 5,638,722 A | 6/1997 | Klingler | 74/502.4 |
| 5,651,583 A | 7/1997 | Klingler et al. | 297/284.4 |
| 5,651,584 A | 7/1997 | Chenot et al. | 297/284.4 |
| 5,704,687 A | 1/1998 | Klingler | 297/284.4 |
| 5,718,476 A | 2/1998 | De Pascal et al. | 297/284.4 |
| 5,758,925 A | 6/1998 | Schrewe et al. | 297/284.6 |
| 5,762,397 A | 6/1998 | Venuto et al. | 297/284.4 |
| 5,769,491 A | 6/1998 | Schwarzbich | 297/284.4 |
| 5,772,281 A | 6/1998 | Massara | 297/284.4 |
| 5,775,773 A | 7/1998 | Schuster et al. | 297/284.1 |
| 5,791,733 A * | 8/1998 | Van Hekken et al. | 297/284.7 X |
| 5,816,653 A | 10/1998 | Benson | 297/284.4 |
| 5,823,620 A * | 10/1998 | Le Caz | 297/284.4 |
| 5,857,743 A | 1/1999 | Ligon, Sr. et al. | 297/284.9 |
| 5,868,466 A | 2/1999 | Massara et al. | 297/284.6 |
| 5,884,968 A | 3/1999 | Massara | 297/216.12 |
| 5,897,168 A | 4/1999 | Bartelt et al. | 297/452.18 |
| 5,911,477 A | 6/1999 | Mundell et al. | 297/284.4 |
| 5,913,569 A | 6/1999 | Klingler | 297/284.4 |
| 5,934,752 A | 8/1999 | Klingler | 297/284.4 |
| 5,975,632 A | 11/1999 | Ginat | 297/284.4 |
| 5,984,407 A | 11/1999 | Ligon, Sr. et al. | 297/284.4 |
| 5,988,745 A | 11/1999 | Deceuninck | 297/284.4 |
| 6,003,941 A | 12/1999 | Schuster, Sr. et al. | 297/284.1 |
| 6,007,151 A | 12/1999 | Benson | 297/284.4 |
| 6,030,041 A | 2/2000 | Hsiao | 297/284.4 |
| 6,036,265 A | 3/2000 | Cosentino | 297/284.4 |
| 6,045,185 A | 4/2000 | Ligon, Sr. et al. | 297/284.4 |
| 6,050,641 A | 4/2000 | Benson | 297/284.4 |
| 6,079,783 A | 6/2000 | Schuster, Sr. et al. | 297/284.4 |
| 6,089,664 A * | 7/2000 | Yoshida | 297/284.4 |
| 6,092,871 A | 7/2000 | Beaulieu | 297/284.4 |
| 6,129,419 A * | 10/2000 | Neale | 297/284.4 |
| 6,152,531 A | 11/2000 | Deceuninck | 297/284.4 |
| 6,152,532 A | 11/2000 | Cosentino | 297/284.4 |
| 6,158,300 A | 12/2000 | Klingler | 74/526 |
| 6,227,617 B1 | 5/2001 | Von Möller | 297/284.4 |
| 6,227,618 B1 | 5/2001 | Ligon, Sr. et al. | 297/284.4 |
| 6,254,186 B1 | 7/2001 | Falzon | 297/284 |
| 6,254,187 B1 | 7/2001 | Schuster, Sr. et al. | 297/284.1 |
| 6,270,158 B1 | 8/2001 | Hong | 297/284.4 |
| 6,296,308 B1 | 10/2001 | Cosentino et al. | 297/284.4 |
| 6,334,651 B1 | 1/2002 | Duan et al. | 297/284.4 |

FOREIGN PATENT DOCUMENTS

| | | | |
|---|---|---|---|
| DE | 29 47 472 | 8/1980 | B60N/1/00 |
| DE | 82 03 540 U | 6/1982 | A47C/7/46 |
| EP | 0 006 840 B1 | 2/1982 | A47C/23/00 |
| EP | 0 169 293 | 7/1984 | A47C/7/46 |
| EP | 0 322 535 A1 | 7/1989 | A47C/7/46 |
| EP | 0 485 483 B1 | 1/1994 | A47C/7/46 |
| EP | 0 434 660 B1 | 5/1995 | A47C/7/46 |
| EP | 0 540 481 B1 | 12/1995 | A47C/7/46 |
| EP | 0 662 795 B1 | 12/1996 | A47C/7/46 |
| EP | 0 702 522 B1 | 3/1997 | A47C/7/46 |
| EP | 0 696 251 B1 | 7/1997 | B60N/2/44 |
| EP | 0 746 219 B1 | 11/1998 | A47C/7/46 |
| EP | 0 797 399 B1 | 11/1998 | A47C/7/46 |
| EP | 0 698 360 B1 | 3/2000 | A47C/7/46 |
| FR | 2 596 334 | 10/1987 | B60N/1/06 |
| GB | 1 423 617 | 2/1976 | A47C/7/46 |
| GB | 2 013 487 A | 8/1979 | A47C/7/46 |
| SU | 587924 | 2/1978 | A47C/7/46 |
| WO | WO92/09451 | 6/1992 | B60N/2/44 |
| WO | WO/00/00064 | 1/2000 | A47C/3/025 |

* cited by examiner

UNIVERSAL ERGONOMIC SUPPORT WITH SELF-CONTAINED ACTUATOR

CROSS-REFERENCE 50 RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

This invention relates generally to ergonomic weight support devices, for seats.

2. Related Art

Lumbar supports and head rests for seats, particularly automobile seats, are known. See U.S. Pat. Nos. 5,050,930; 5,397,164; 5,498,063; 5,626,390; 5,775,773; 6,003,941; 4,354,709; 4,452,485; 4,632,454; 4,880,271; GB 2 013 487A and D 169 293 B1. These devises all have in common one or more flexible members that may be flexed in order to create a convex surface with its apex towards the lumbar spine of a human being sitting in the seat into which the device is incorporated. This convex flexion is induced by any of a great variety of means for compression, See, e.g., U.S. Pat. No. 4,354,709 or tension, See, e.g., U.S. Pat. No. 5,498,063. It is universal among these prior art lumbar supports that both an upper extremity of the convex pressure element and the lower extremity of it are anchored to a framework within the seat. These upper and lower elements may be fixedly anchored or movably anchored, or a combination of the two, so long as they may be pressured to move closer together to project the apex of the convexity farther out from the plane of the seat for greater lumbar support and conversely may have pressure released in order to move the apex of the convexity closer to the plane of the seat for less lumbar support.

Whether the pressure producing a greater or lesser convexity is produced by compression or tension, all prior art lumbar support devices have required the use of plurality of moving parts, many of which are under dynamic tension for actuation of the convexity, and again under dynamic tension for supporting the weight of the seat passenger. The multiplicity of moving parts in prior art lumbar supports complicates manufacture, increases expense of materials necessary, increases the likelihood of component failure and shortens the life span of the devices.

Moreover, prior art lumbar supports require a relatively large amount of space to accommodate the relatively cumbersome tensioning or compression apparatuses, together with the frameworks necessary for their support. Accordingly, prior art devices are generally limited in their applications in that it is difficult to convert their component orientation for support of other parts of the human body in a seat, as, for example, the head and neck or the thighs.

As seat designs are modified to incorporate more comfort devices, such as duct work for heating and cooling, the amount of space available inside seats for lumbar support devices shrinks. There is need for smaller lumbar supports.

There is a need in the art for a universal ergonomic support which occupies less space, costs less to manufacture and install, simplifies manufacture, decreases needed components, uses a more robust mechanism for supporting the weight of a human passenger and/or may be more universally used for lumbar, head and neck and thigh support as well as only lumbar support.

SUMMARY OF THE INVENTION

This invention is a universal ergonomic support for seats, especially automobile seats. The device includes a pressure surface rotateably or slideably fixed at one end to a housing and free at the other end. Underneath the pressure surface and medial to the fixed end of it is a lever, piston cam, traction pin, or other expansion means for biasing the pressure element towards the passenger of the seat into which the device is incorporated.

It is an object of the present invention that it use a relatively small number of moving parts which are simple in design and movement.

It is a further object of the present invention that it be compact in size for ease of packaging and ease of incorporation into a variety of different seats, automobile seats and incorporatable at various positions and in various orientations.

It is a further object of the present invention that it be economical to manufacture, sell, assemble, maintain and operate.

It is a further object of the present invention that the device be operable by means of a motor, mechanical means or a combination of the two.

It is a further object of the present invention that more than one support device may be incorporated in a single seat for a plurality of ergonomic supports, including but not limited to lumbar support, double lumbar support, head/neck support, rib support and/or thigh support.

It is a further object of the present invention that it be able to tolerate excessive or abusive loads.

It is a further object of the present invention to ease and streamline the manufacture of the device and of seats incorporating the device, to lower production costs and increase durability and useable life of the device and seats incorporating it.

It is a further object of the present invention that it may be incorporated easily with existing components, as, for example, seat frames or headrests, and with future seats which may have less space available within them.

It is a further object of the present invention that it not require guide wires, outside actuators, attachment brackets or long cables.

Further features and advantages of the present invention, as well as the structure and operation of various embodiments of the present invention, are described in detail below with reference to the accompanying drawings.

DETAILED DESCRIPTION OF THE PREFERRED EMBODIMENTS

Figure 1:
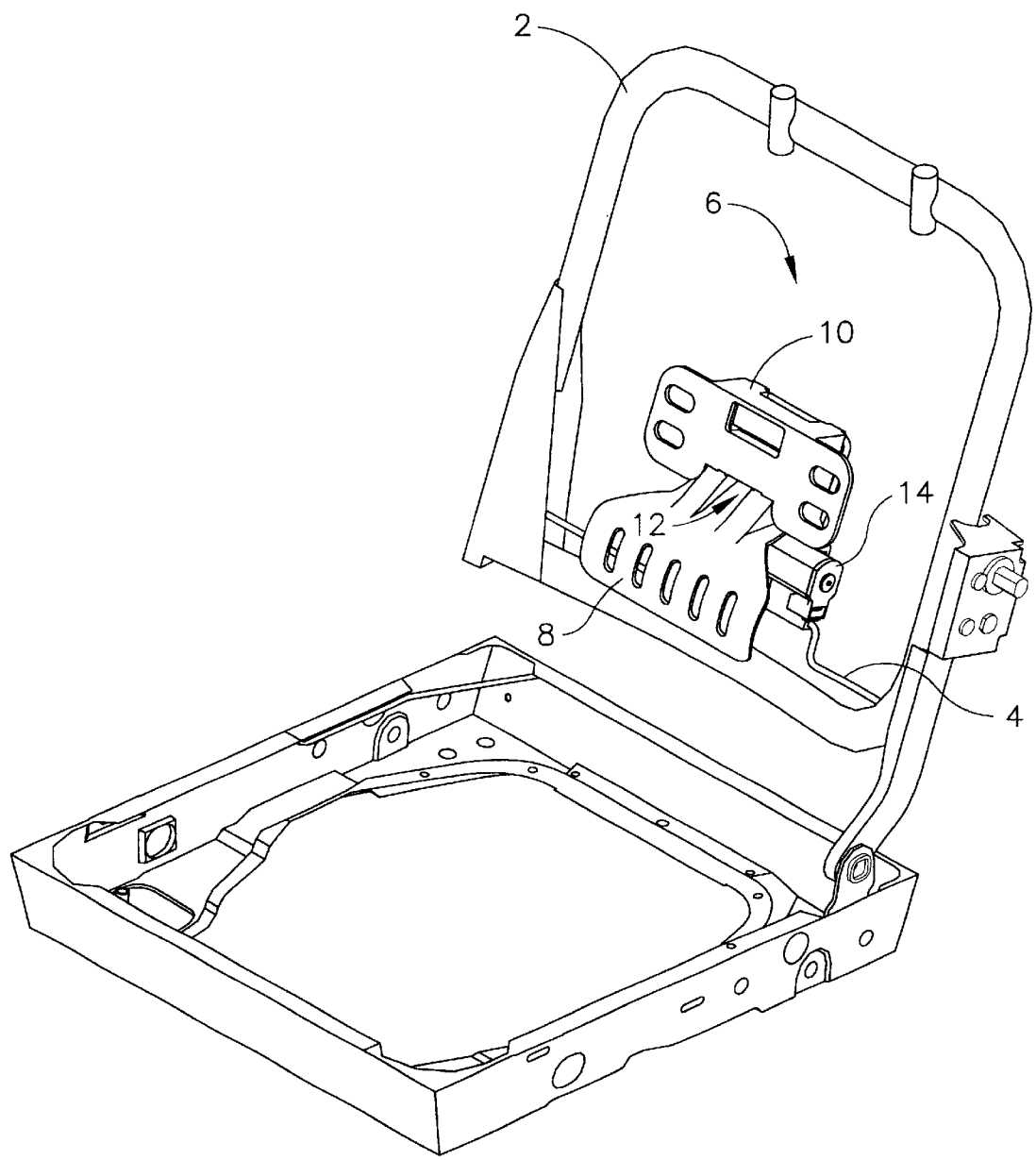
FIG. 1 is an oblique view of a seat incorporating the device of the present invention in a low apex lumbar support position.

Referring to the accompanying drawings in which like reference numbers indicate like elements, FIG. 1 is an oblique view of the device of the present invention incorporated in a seat as a low apex lumbar support. Seat back frame, 2, supports an optional wire mount, 4, for the support device of the present invention, 6. Pressure surface, 8, is rotateably/slideably connected to device housing, 10, at port, 12. Engagement of motor, 14, moves pressure surface, 8, outward towards the lumbar spine of a person sitting in the seat.

Figure 2:
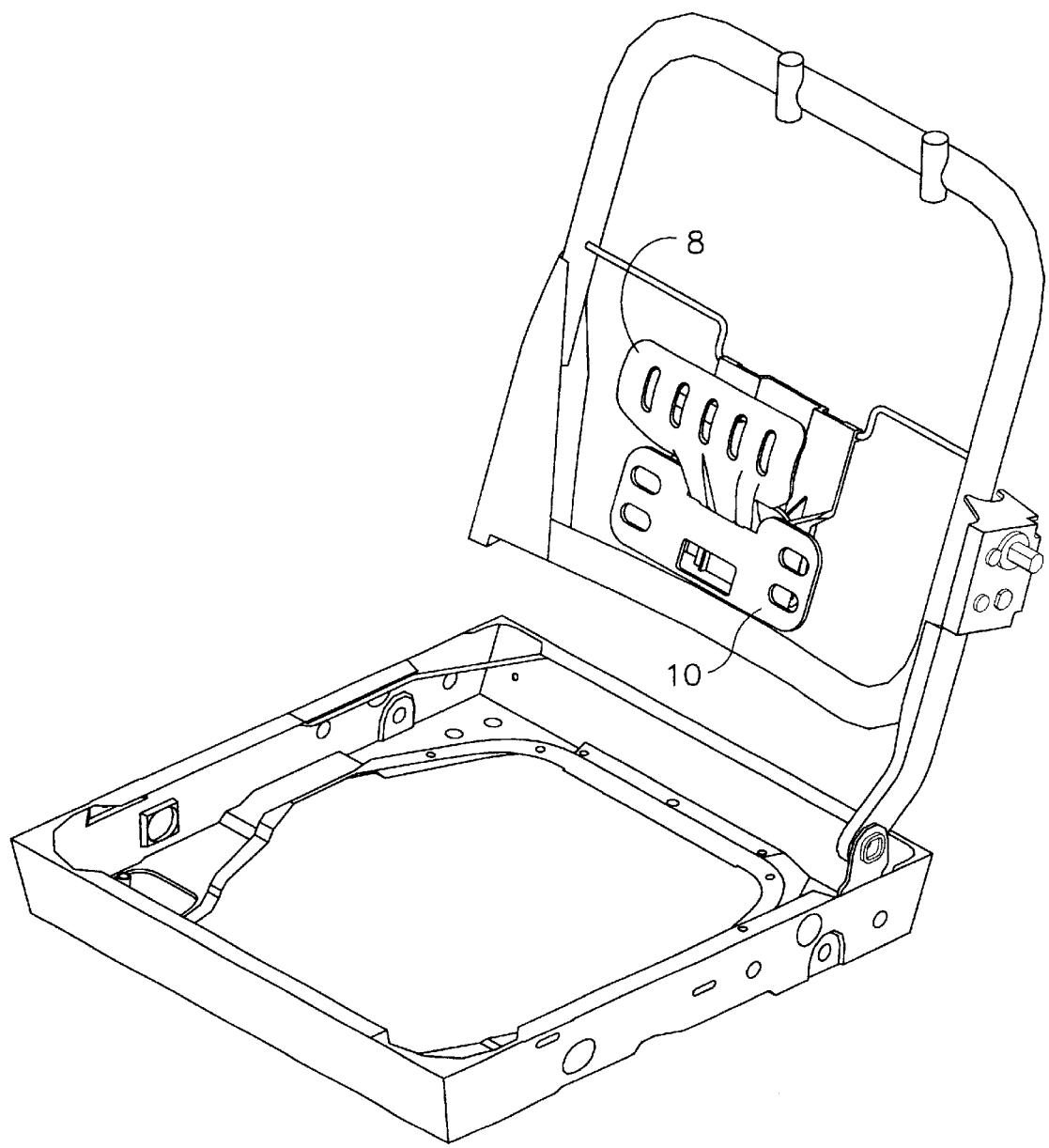
FIG. 2 is an oblique view of a seat incorporating the device of the present invention in a high apex lumbar support position.

FIG. 2 depicts the support device of the present invention in a high apex position. Here, the device is simply mounted upside down, relative to the orientation depicted in FIG. 1. The pressure surface, 8, and device housing, 10, are inverted.

Figure 3:
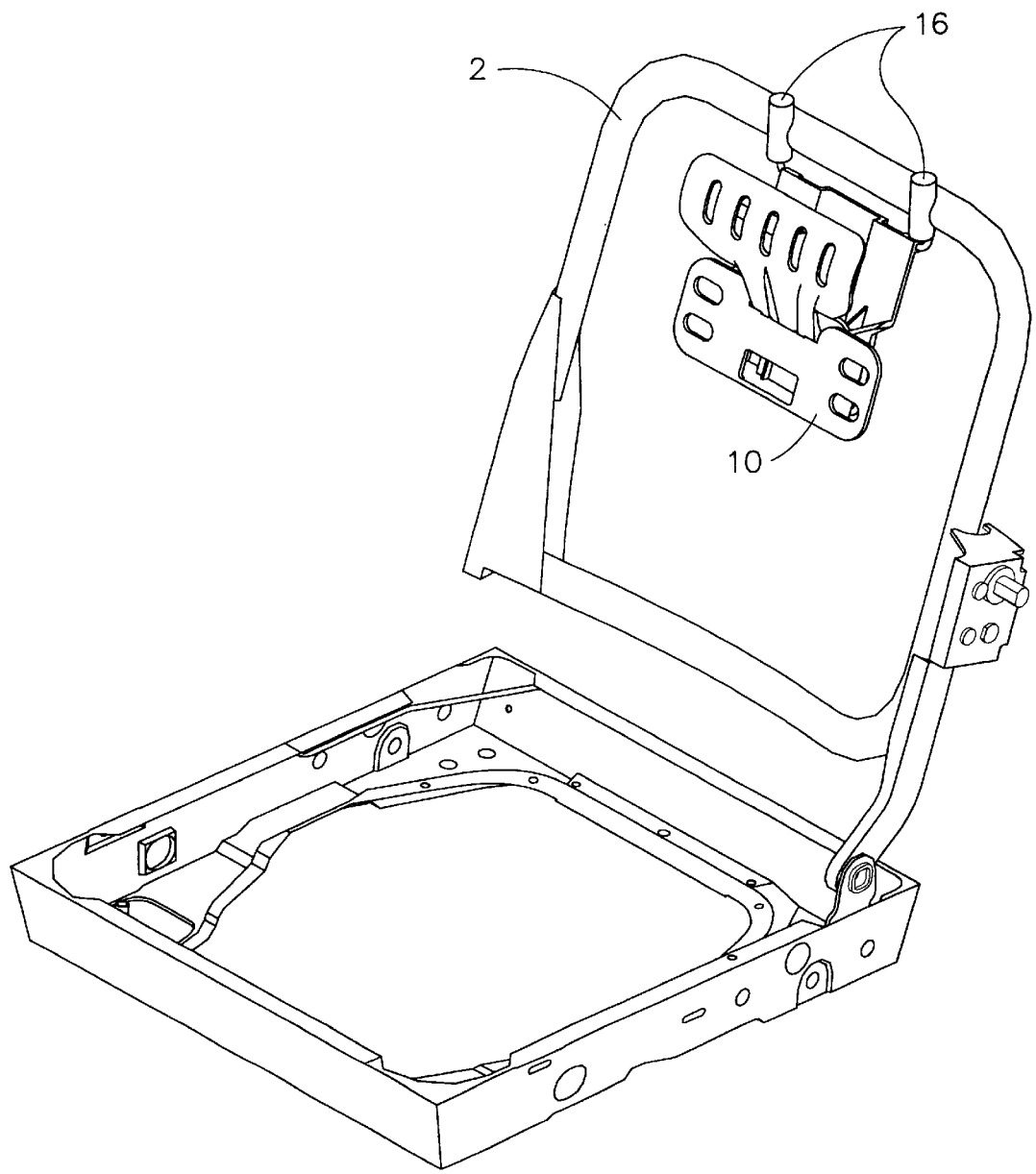
FIG. 3 is an oblique view of a seat incorporating the device of the present invention in a neck support position.

FIG. 3 depicts the support device of the present invention used as a neck support. Device housing, 10, is fixedly attached to seat back frame, 2, at mounts, 16. Optionally, the device may be mounted on slideable mounts.

Figure 4:
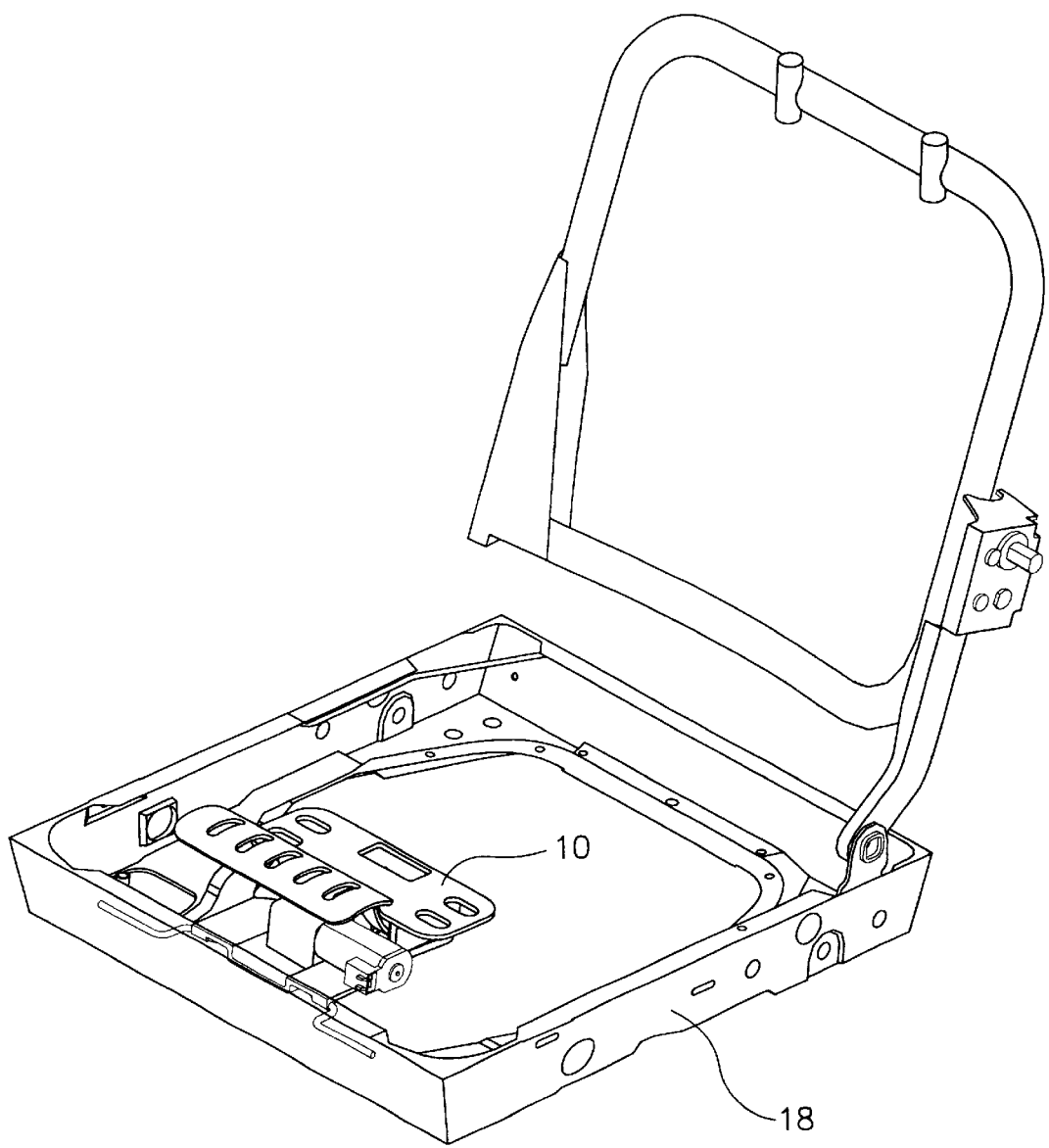
FIG. 4 is an oblique view of a seat incorporating the device of the present invention in a thigh support position.

FIG. 4 depicts the support device of the present invention deployed as a thigh support. Here, device housing, 10, is fixed to the front of seat bottom frame, 18, so that the pressure surface may rise against the bottom of the thighs of the person in the seat.

FIGS. 1–4 show the modular nature and flexibility of application of the present invention which are achieved by its compact size and simplicity of operation. They also show the relatively small volume of space within the seat which is occupied by the invention. This advantageous size is not mere miniaturization of prior art devices. Instead, the novel configuration of the actuation device within and between the pressure surface and housing accounts for the size. In its preferred embodiment, the present invention is 40–50 mm thick (in rest position), 140–180 mm wide, and about 160 mm high. Lumbar support extension is about 50 mm; an extension previously attainable only with much larger prior art devices.

Figure 5:
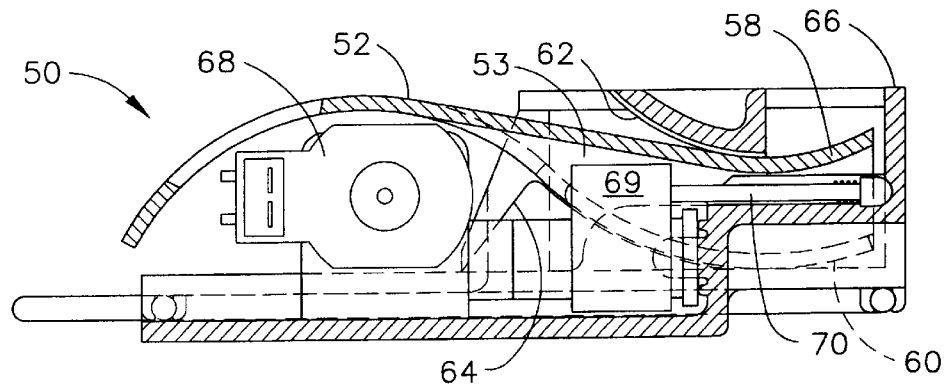
FIG. 5 is a side view of the present invention in its rest position.
Figure 6:
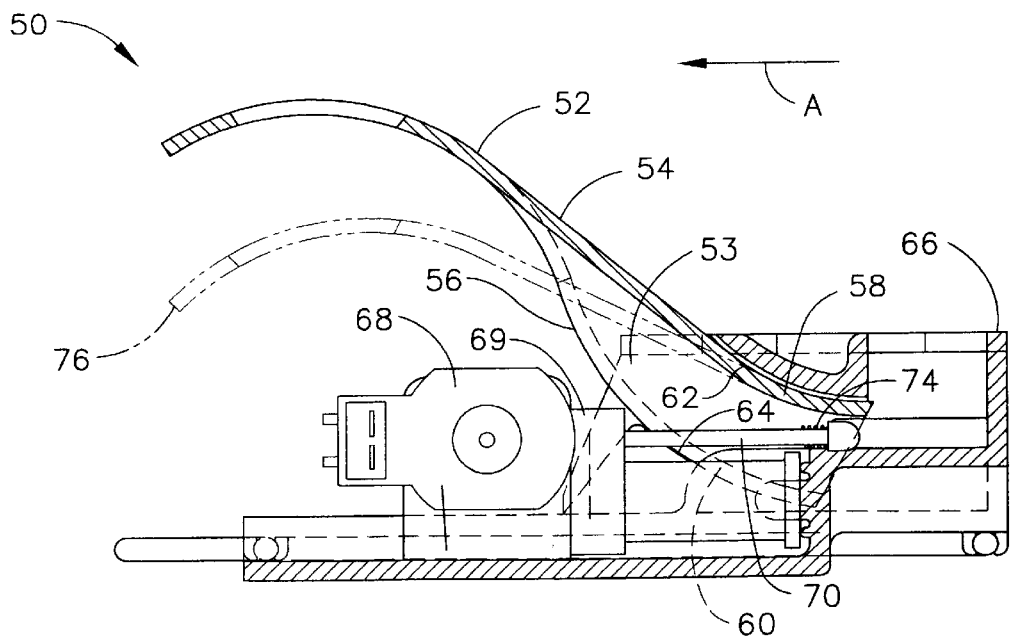
FIG. 6 is a side view of the present invention in its full out position.

FIG. 5 is a side view of the present invention in its rest position. FIG. 6 is a side view of the present invention in its full out position. Weight supporting pressure surface, 50, is an area on a single piece of material, preferably plastic and most preferably nylon, called a "basket," 52. The basket, 52, may be made by any number of other manufacturing techniques, for example, stamped metal. The basket has a free end, 50, which is the pressure surface, sometimes referred to by those of skill in the art as the "paddle." The basket also has a restrained or encapsulated opposite end, called the "slide" in this depicted preferred embodiment. The slide is enclosed within the channel, 53, formed by the interior surfaces of the housing, 66. Basket, 52, has an upper curvilinear surface, 54, and a lower curvilinear surface, 56. The basket has a middle detent, 58, having two lateral flanges, 60.

The curvilinear top surface, 54, of the basket detent, 58, works in close, slideable cooperation with the curvilinear bottom surface of fixed housing guide, 62. The bottom curvilinear surface, 56, of the lateral flanges, 60, work in close slideable cooperation with the curvilinear top surface of fixed lower guide, 64. In operation, a tractive force is put on the basket, 52, at or near the end of the slide. The curvilinear surfaces of guides 62 and 64 work in sliding cooperation with the basket slide surfaces, 54 and 56, in order to effectuate a simultaneously arcuate and lateral motion of the weight bearing pressure surface ("paddle") of the basket. In FIGS. 5 and 6 the lateral motion, that is, the motion towards the body of the passenger, is oriented in an upwards direction.

Guides 62 and 64 are fixedly attached to support housing, 66. Preferably they are molded bosses. Preferably the housing is plastic, but may be comprised of other materials. It is preferred that the sliding surfaces of the guides and basket define a smooth, stepless curve, but straight or stepped surfaces are contemplated to be alternative, equivalent embodiments of the present invention. Support housing, 66, also serves as a mount for motor, 68. Motor, 68, is in tractive communication with traction pin, 70, through any of a variety of conventional means. In the preferred embodiment the motor axle tractive force is guided through an attached, coaxial worm gear, which engages a spindle (not shown). The spindle engages a threaded block, 69, holding the traction pin, 70. Optionally, traction pin, 70, may be a cable, wire, hard drawn wire, rod, bracket, spoke or the equivalent.

In operation, motor, 68, exerts a tractive force on threaded block, 69, which in turn puts tension pin, 70 in traction. Tension pin, 70, is frictionally and hingedly affixed to the lower surface of basket detent, 58. Tractive force is applied to basket, 52, in the direction of arrow A. As the basket travels, it is guided through its preferred path by sliding frictional contact with the curvilinear surfaces of guides 62 and 64.

Tension pin (or wire, spoke or the like), 70, is anchored in both the threaded block, 69, and the basket slider end by means of a notch, eye, bracket or the equivalent. The anchors at either end of the pin have some clearance, preferably 15–20 degrees, so that the pin is free to traverse or nutate somewhat in order to accommodate the arcuate path of the slide in the housing channel, 53, as the motor, 68, extends the paddle.

Optionally, spring, 74, may be interposed between the basket and the traction pin to insure against breakage from abusive loads, to further mediate tensions placed on the device, and/or to promote the comfort of a seat occupant.

It is clear from the depictions in FIGS. 5 and 6 that only one end of the basket is fixed to the support housing, 66, and thereby to the seat. The other end of the basket, weight supporting pressure surface, 50, moves freely from any fixation to the support housing, 66, or seat. Pressure surface, 50, acts outwardly towards the passenger through the fabric of the seat cover, padding, or, optionally, through any conventional seat support systems such as webs, wires, or lateral, sinusoidal springs. The pressure area end, 50, of the basket, 52, being free, flexes under pressure. A flexed position, 76, is depicted in FIG. 6. This flexed position would be assumed by the basket pressure area upon the weight of a passenger being applied against it. This flexion increases passenger comfort and helps prevent damage to the system from abusive loads.

Figure 7:
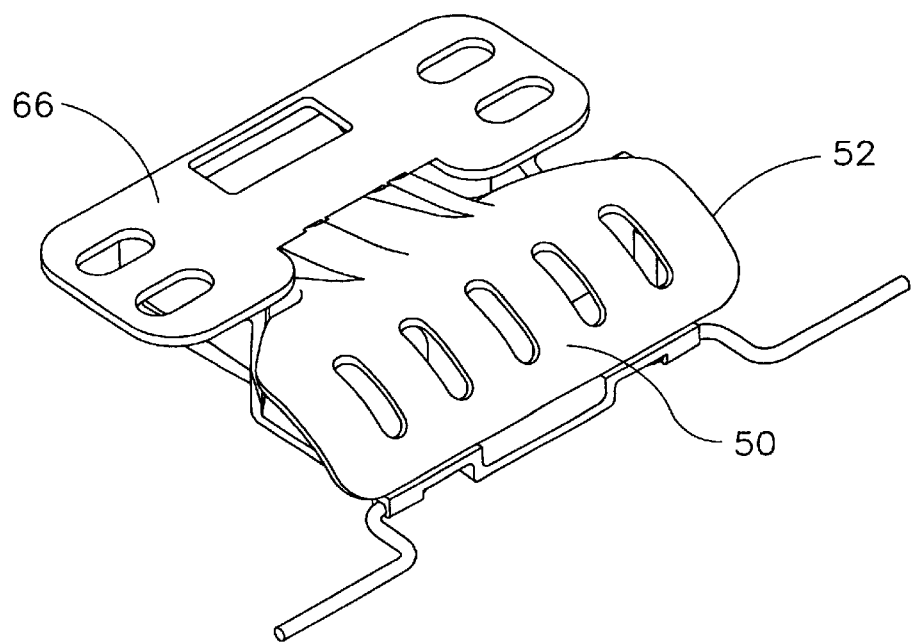
FIG. 7 is an oblique view of the present invention in its rest position.
Figure 7A:
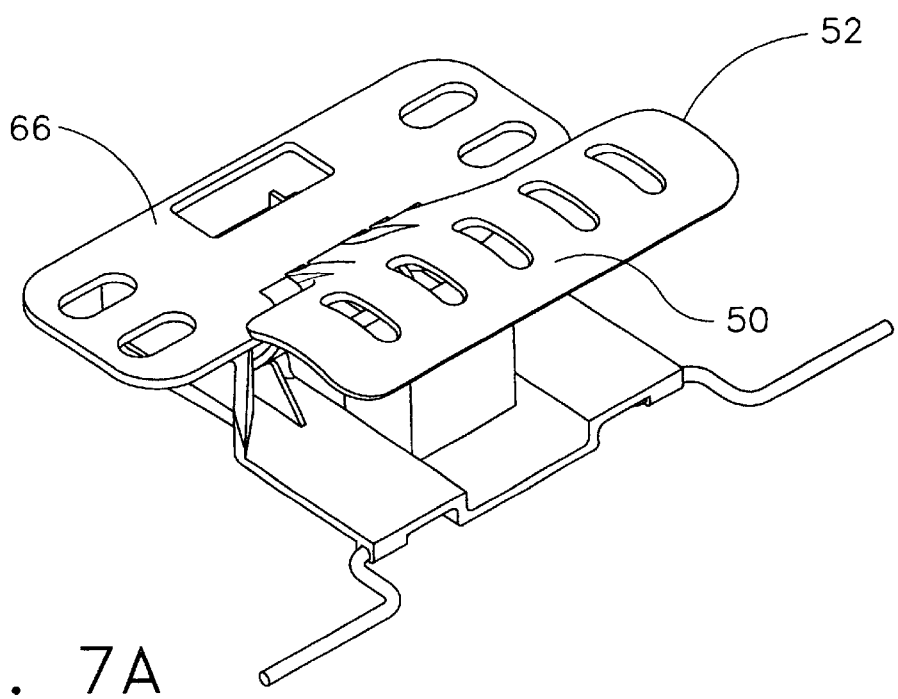
FIG. 7a is an oblique view of the present invention in its full out position.
Figure 7B:
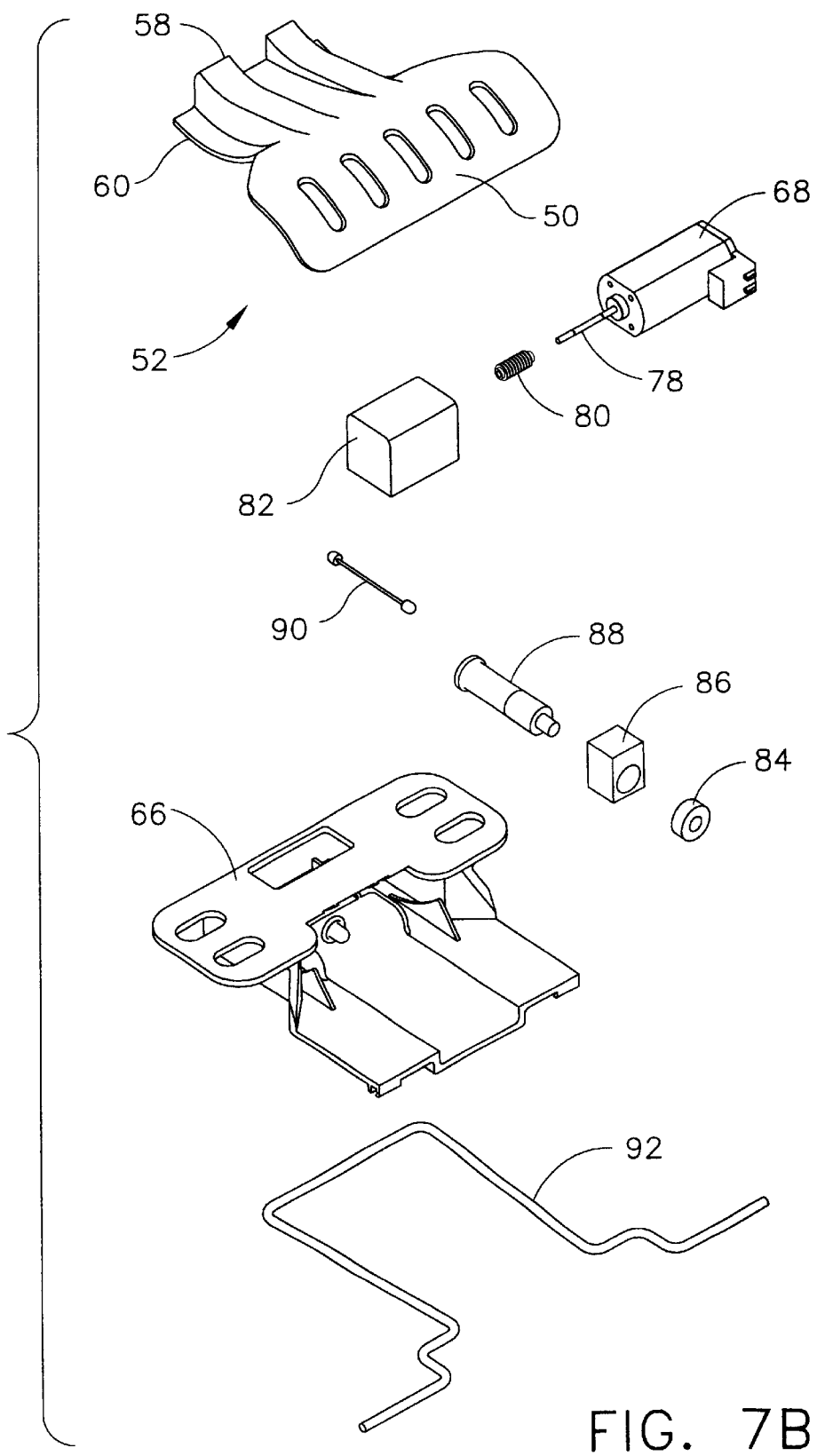
FIG. 7b is an exploded view of the present invention.

FIG. 7 is an oblique view of the device of the present invention showing the support housing, 66, and pressure surface, 50 with the basket, 52, in the down or rest position. FIG. 7a shows the same oblique view with the basket in the full out position, which raises the pressure area, 50. FIG. 7b is an exploded view of the device of the present invention showing the basket, 52, and the various aspects of the basket including pressure area, 50, detent, 58, and flange, 60. On the opposite side of detent, 58, hidden from view, is an opposite flange corresponding to the visible flange, 60. Motor, 68, motor axle, 78, worm gear, 80, are all mounted within housing, 82. Worm gear, 80, works in drive train cooperation with spindle, 88, threaded traction block, 86, and traction pin or cable, 90. The gearing on spindle, 88, may be molded in or may be an attached helical gear, 84. All the aforesaid parts comprise an actuator unit, which is fixedly attached to support housing, 66.

The integration of the actuator unit within the housing and under the paddle it actuates simplifies the apparatus, makes it more compact and obviates any need for separate actuation hardware with its addition space, assembly and cost requirements. In some cases, mounting of the device of the present invention may be best achieved by the use of an optional wire attachment component, 92. Mounting is not limiting, however. In fact, the novel configuration of the present invention is advantageous in that it allows for greater freedom in mounting options than previously possible. The present invention may be mounted by bolts, springs, clamps, rivets, snaps, hooks, or any such equivalent. It may also be mounted "in suspension," that is, in cooperation with conventional wire or spring webs used to support a passengers weight, as in FIGS. 10 and 11. No mounting guide wires or rods are necessary, which further conserves space.

Figure 8:
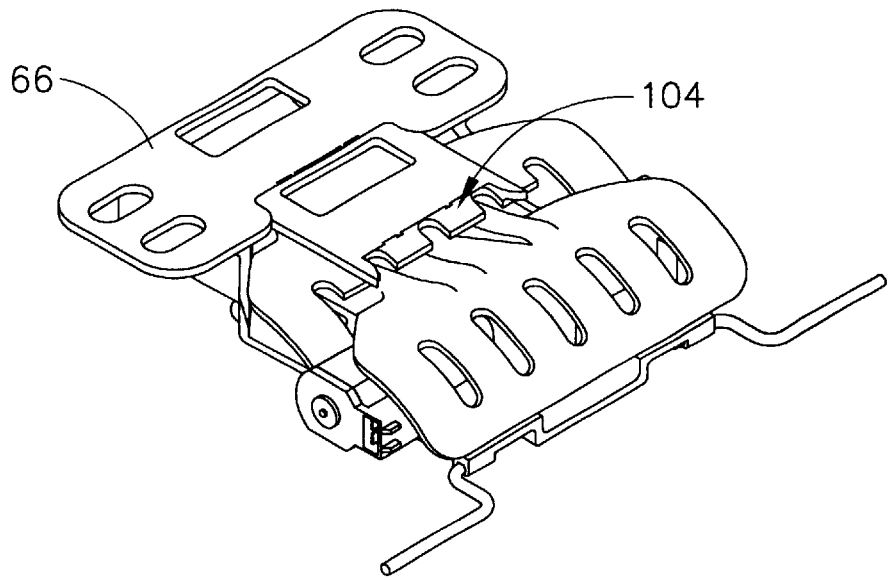
FIG. 8 is an oblique view of dual lumbar version of the present invention in its rested position.
Figure 8A:
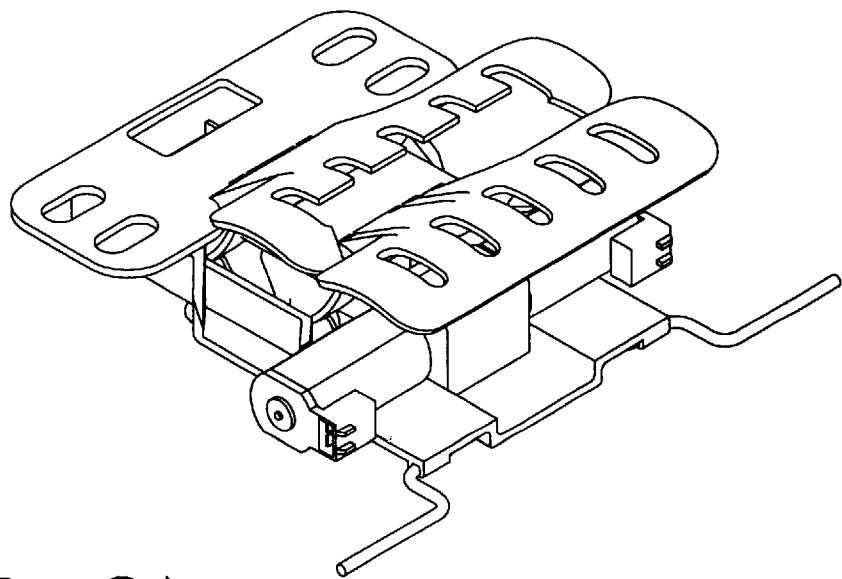
FIG. 8b is an oblique view of the dual lumbar version of the present invention in its full out position.
FIG. 8c is an exploded view of a dual lumbar version of the present invention.
Figure 8B:
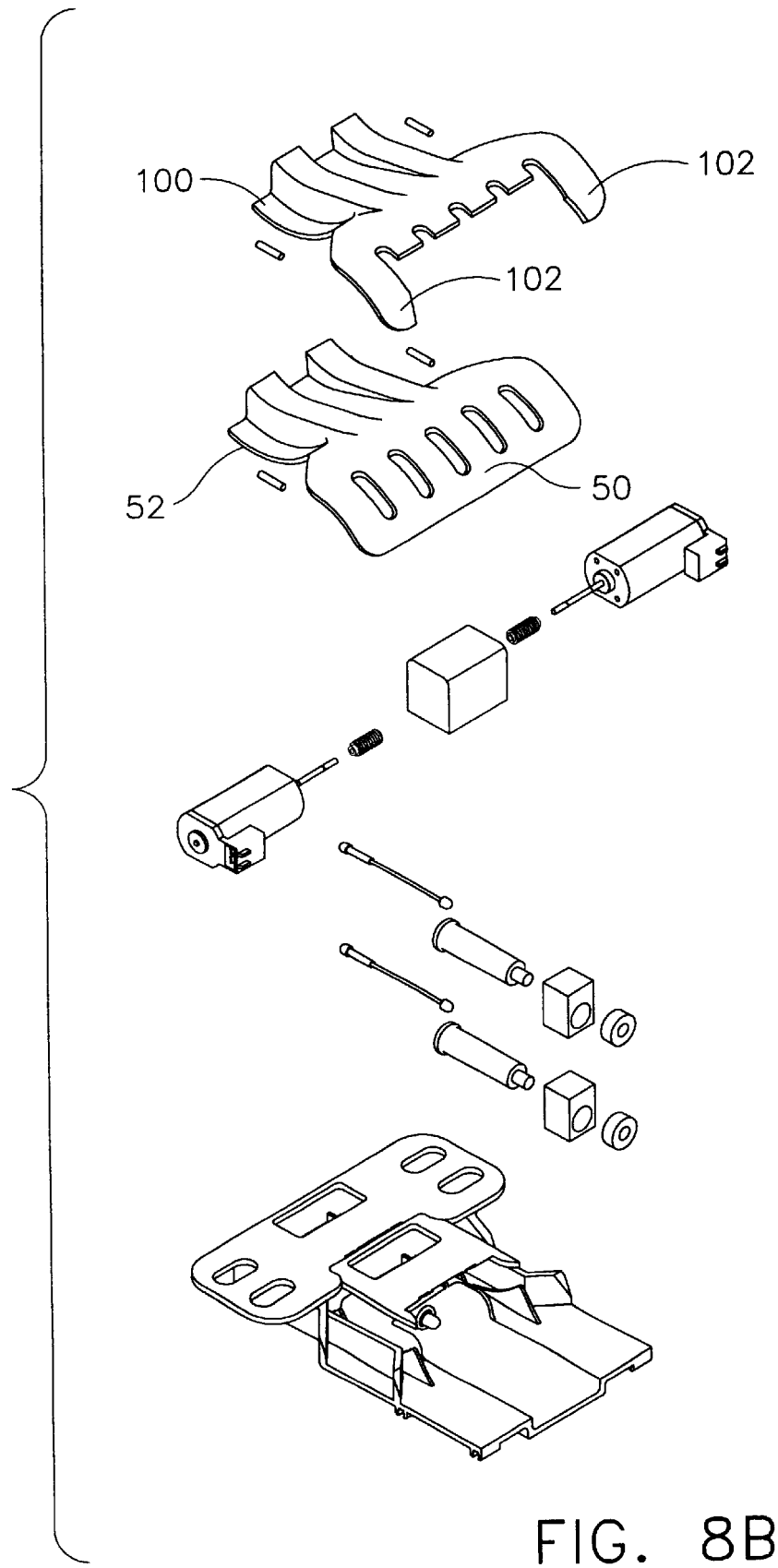

FIGS. 8, 8a and 8b depict an optional configuration of the present invention. In this configuration there are not one but two baskets which may be actuated independently by two separate motors, or, optionally, in cooperation with one another. Upper basket, 100, is designed with tines, 102, dimensioned such that the pressure area of the original basket, 50, may move freely between the tines, 102. Since additional basket, 100, is offset from the basket, 52, in its encapsulated slide connection, 104, to support housing, 66, the cooperating relationship between the tines, 102, of additional basket, 100, and the original pressure area, 50, allow for a great degree of control of the shape, convexity and degree of lumbar pressure which may be achieved by this configuration of the present invention. By moving the two "paddles" independently or in unison a seat occupant can control the shape, level and magnitude of the apex of the lumbar support convexity.

Figure 9A:
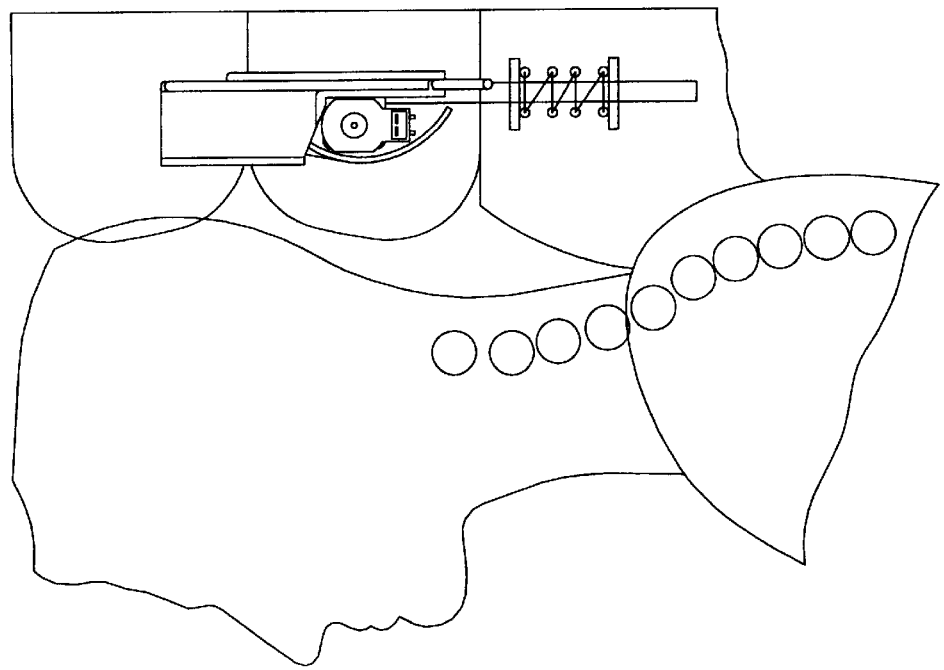
FIG. 9a is a side view of the present invention configured as a neck support with the headrest down and the device in its rest position.
Figure 9:
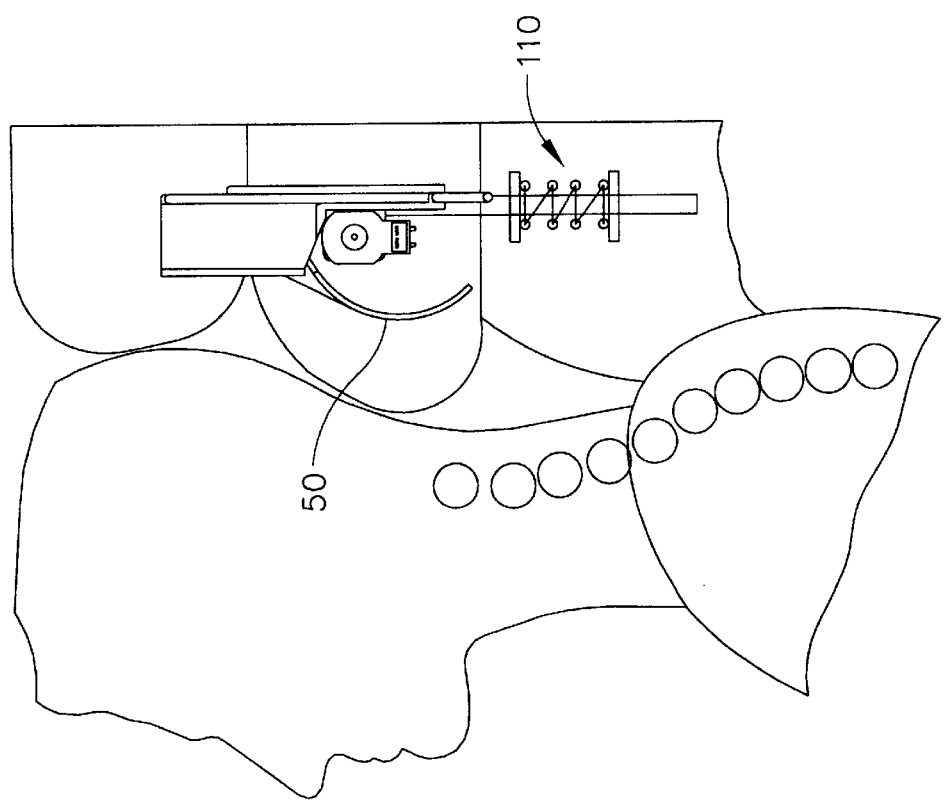
FIG. 9 is a side view of the present invention in use as a neck support with the headrest lowered and the device in its full out position.
Figure 9C:
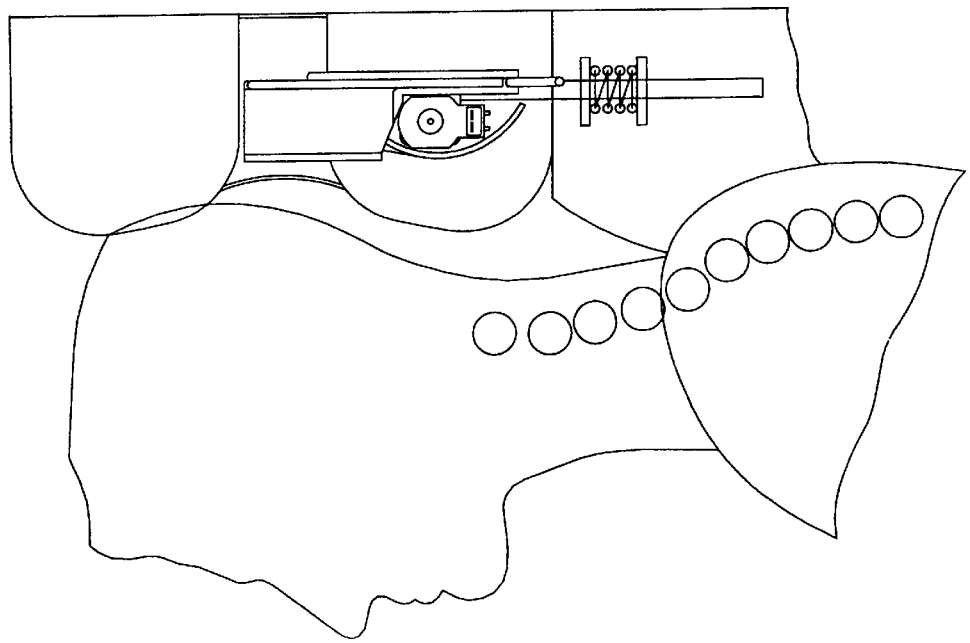
FIG. 9c is a side view of present invention in its neck support configuration with the headrest up and the device in its rest position.
Figure 9B:
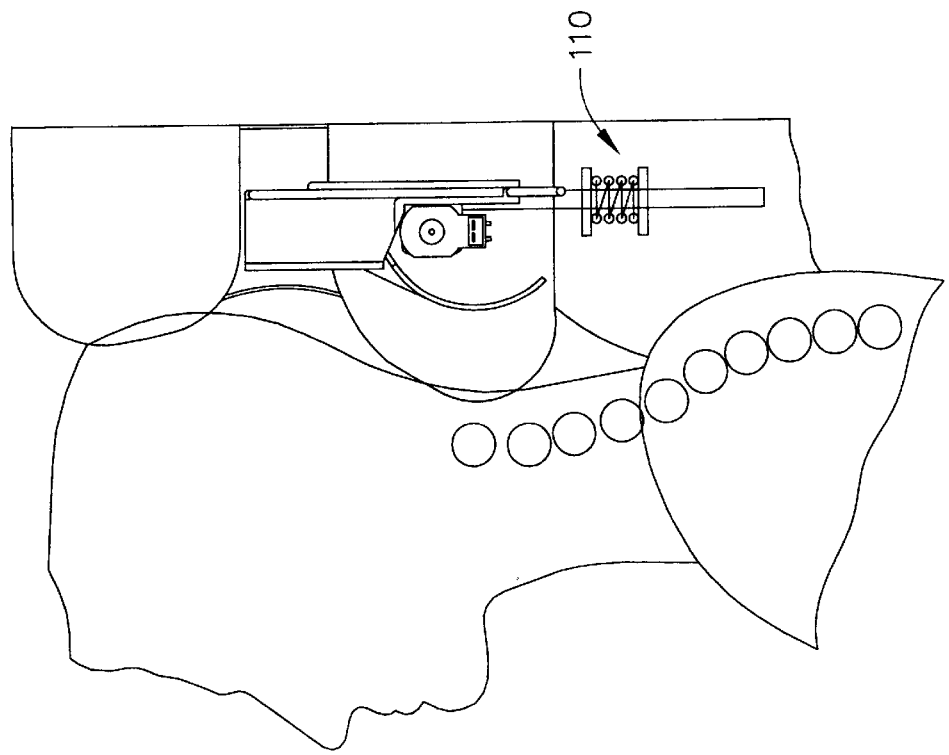
FIG. 9b is a side view of the present invention configured as a neck support with the headrest up and the device in its full out position.

FIGS. 9, 9a, 9b and 9c depict the apparatus of the present invention configured as a neck support. FIGS. 9 and 9a depict the device in use with the headrest in the down position. FIGS. 9b and 9c depict the device of the present invention in use with the headrest in the up position. The headrest is moved up and down according to any of a variety of conventional means, here depicted at 110. The movement of the pressure surface of the present invention is independent of the position of the headrest. Accordingly, any combination of head support configurations may be selected by the passenger. Again the compact size of the present invention allows it to be deployed within the relatively small confines of a conventional headrest, including headrests already in production. FIG. 9 depicts the headrest down and the pressure area, 50, extended. FIG. 9a depicts the headrest down and the pressure area retracted. FIG. 9b shows the headrest up and the pressure area extended. FIG. 9c shows the headrest up and the pressure area retracted.

Figure 10:
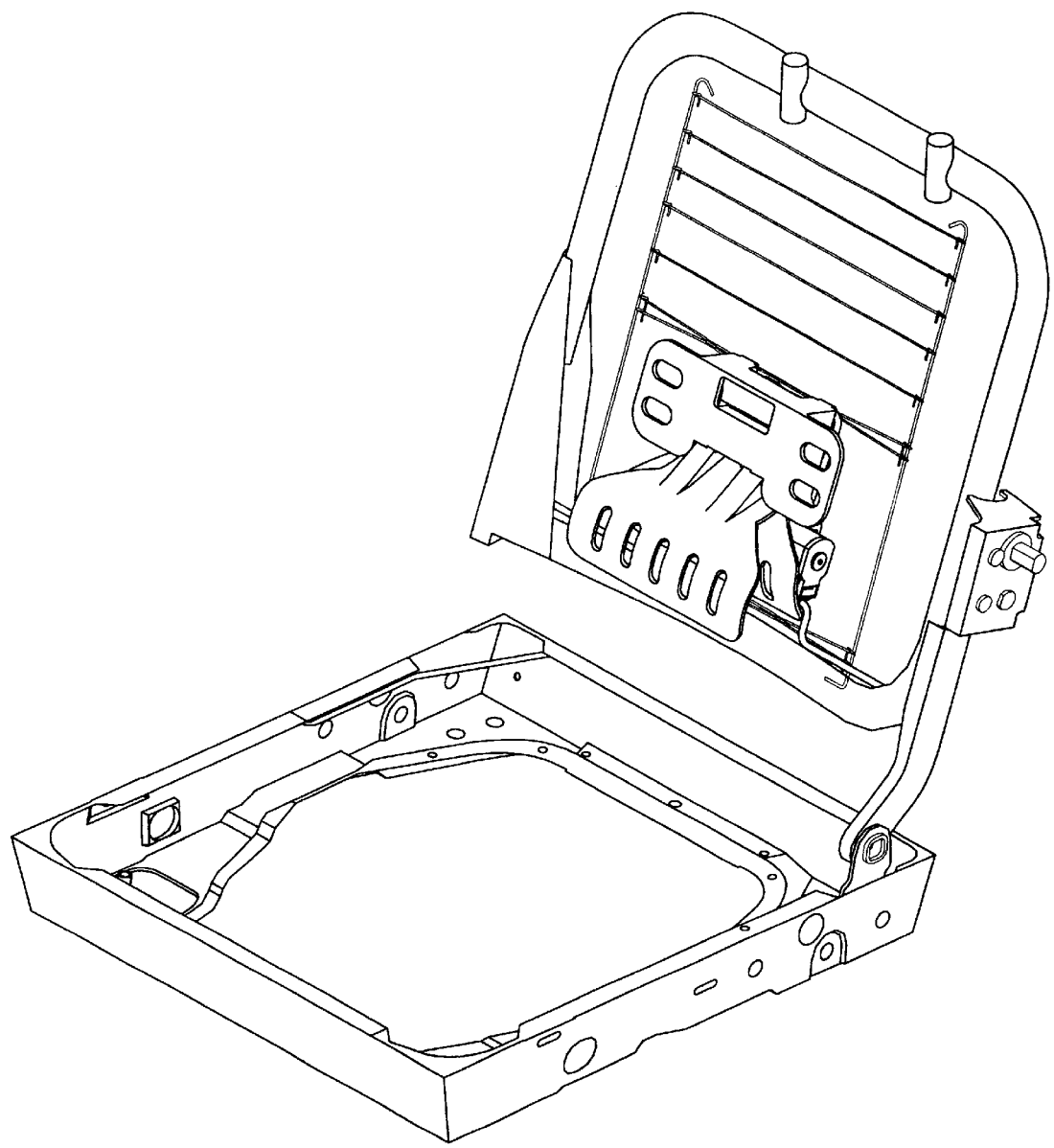
FIG. 10 is the device of the present invention configured as a two-way lumbar support.
Figure 11:
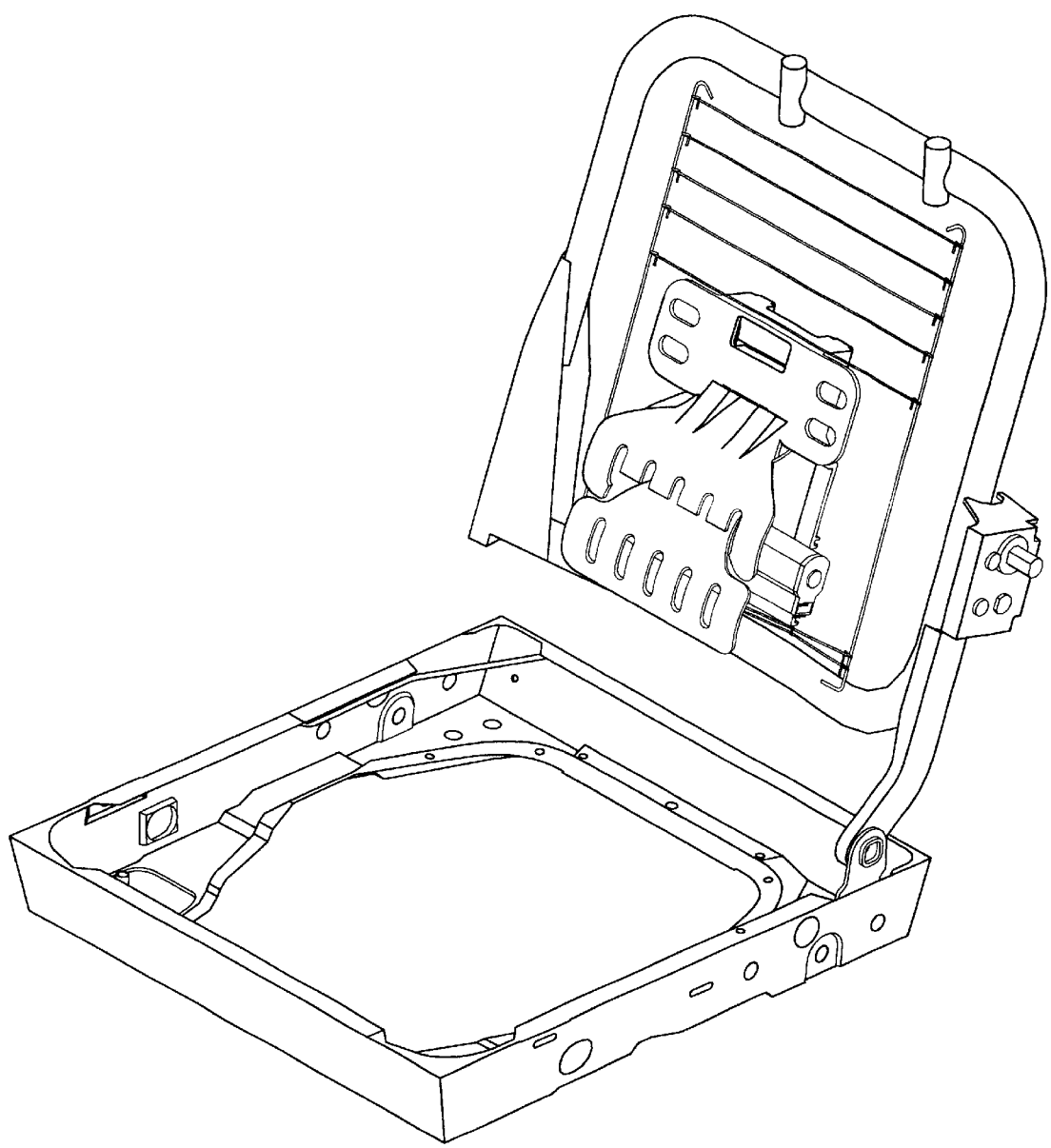
FIG. 11 is the device of the present invention configured as a four-way lumbar support.
Figure 12:
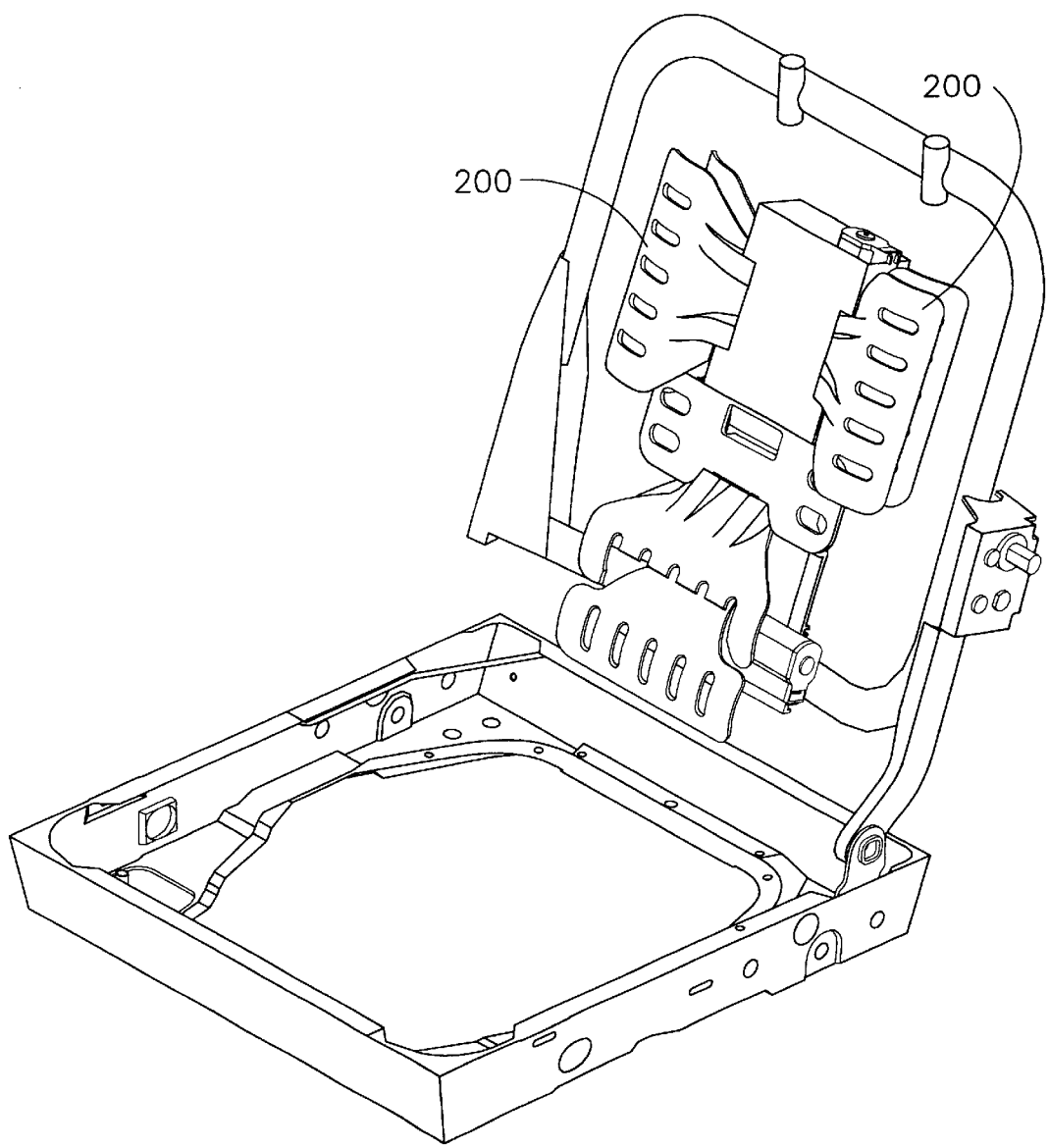
FIG. 12 is the device of the present invention configured as a six-way lumbar and back support.
Figure 13:
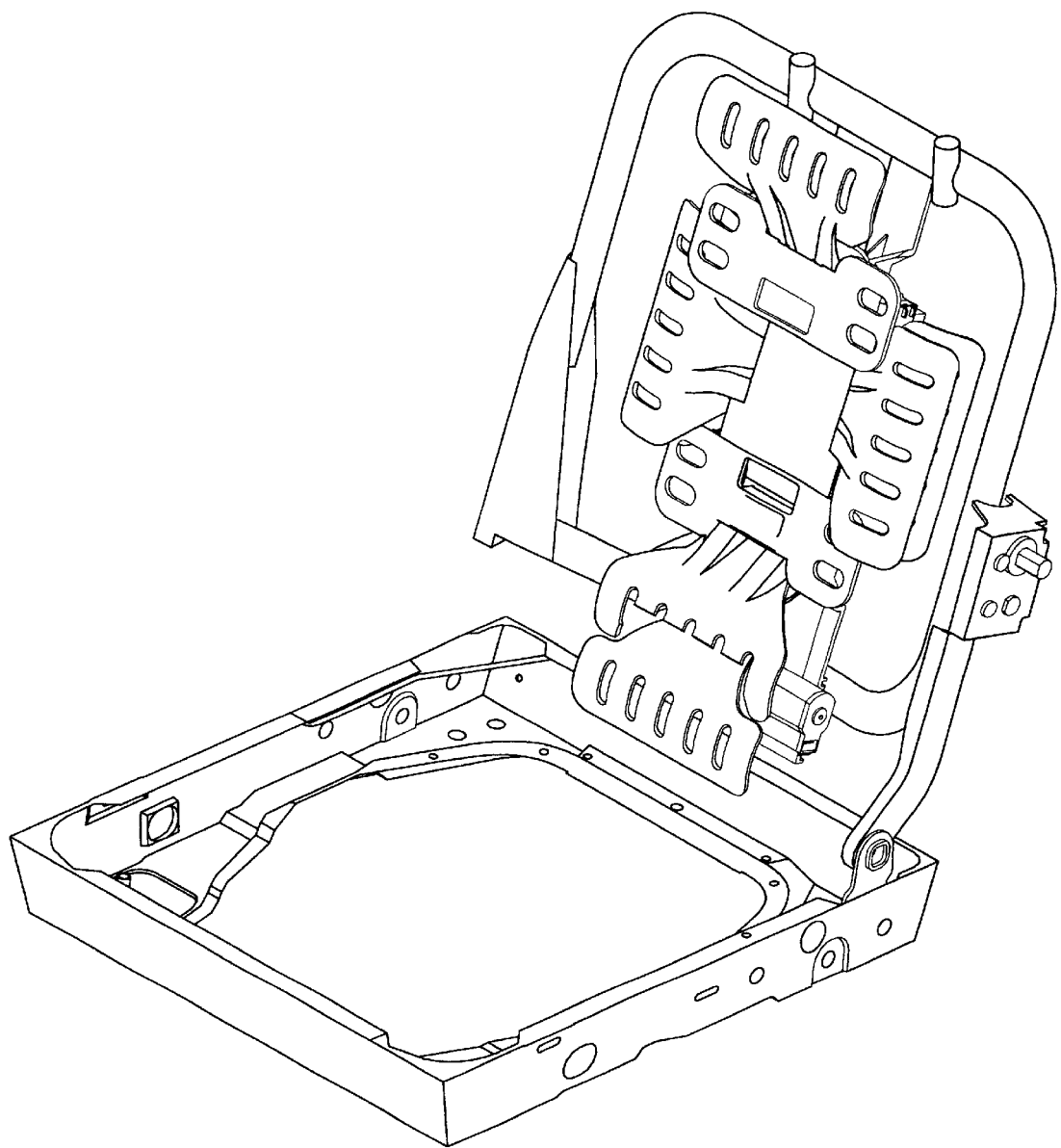
FIG. 13 is the device of the present invention configured as an eight-way lumbar, back and neck support.

The present invention may be deployed in any of a great variety of orientations and configurations. Only minor modifications of the support bracket are necessary to enable a great variety of configurations. FIG. 10 depicts a simple lumbar support configuration. FIG. 11 depicts the same configuration using the double basket assembly. FIG. 12 depicts the addition of two more units of the present invention, 200, on either side of the thoracic area of the passenger's back, which units are deployed at a 90° from the lumbar support unit and 180° angles from one another. Thereby, rib support may be achieved. FIG. 13 depicts the possible combination of a double lumbar support as in FIG. 11 with neck support as in FIGS. 9 and rib support as in FIG. 12.

Figure 14:
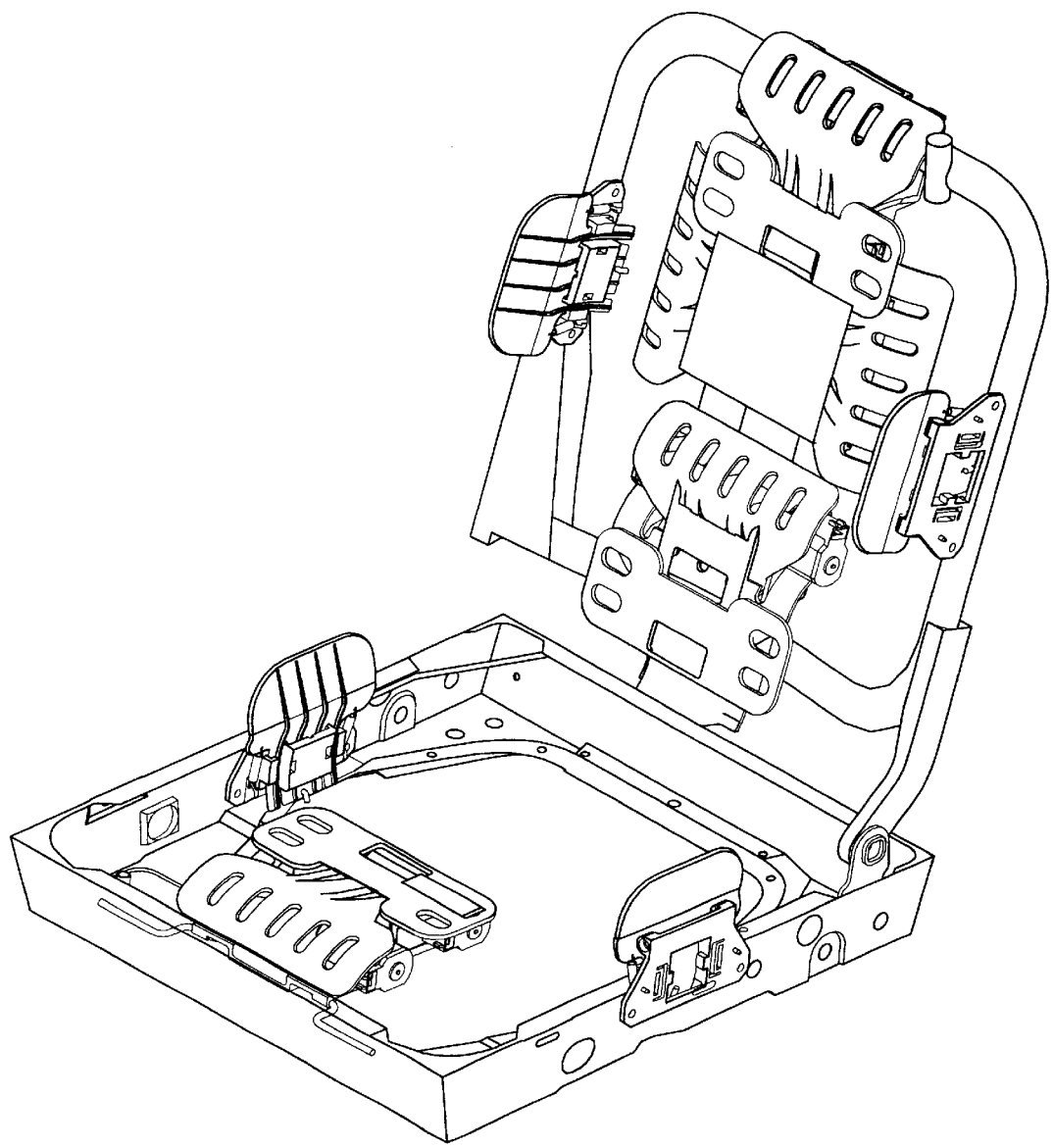
FIG. 14 is the device of the present invention configured as a sixteen-way ergonomic support system, in its rest position.
Figure 15:
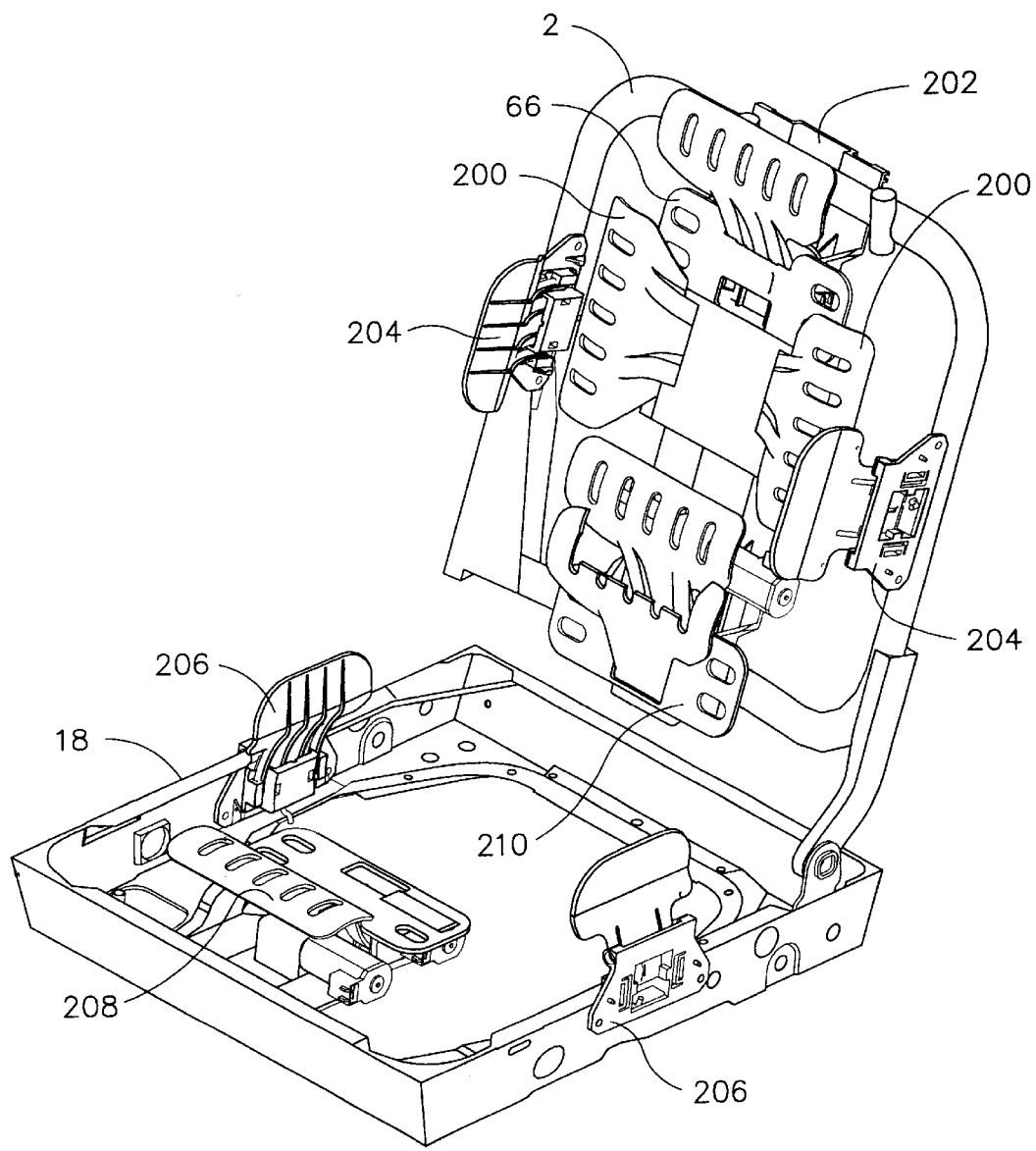
FIG. 15 is the device of the present invention configured as a sixteen-way ergonomic support system in its fully out position.

FIGS. 14 and 15 depict the possibility of mounting the basket of the present invention directly to the seat frame, either back or bottom in order to achieve an even greater variety of support vectors. In FIG. 15 support housing, 66, serves as a mounting for rib bolsters, 200, and also for neck support area, 202. The seat back frame itself, 2, is the support onto which side pressure elements, 204, are directly mounted. Similarly, outer thigh support pressure areas, 206, are mounted directly to seat bottom frame, 18. Thigh support is also provided by another pressure area mounting, 208. FIG. 14 also depicts the reverse mounting of the double basket configuration for lumbar support, 210.

Another configuration not depicted would be a two paddle neck support with the paddles opposing one another in a "butterfly" arrangement.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

What is claimed is:

1. An ergonomic weight support apparatus for a seat comprising:

A housing having an arcuate channel defined by at least one guide boss;

An extending element having a pressure surface substantially at an unattached end of said extending element, the pressure surface being convex toward a seat occupant and being flexible in response to pressure, said extending element also having an arcuate encapsulated end slidingly disposed within the channel of said housing;

A motor fixedly attached to said housing;

A traction pin having a first end in geared engagement with said motor and a second end in tractive communication with the encapsulated end of said extending element whereby said motor mediates travel of said extending element between a retracted position and an extended, weight supporting position.

2. A seat comprising:

a bottom surface for supporting the weight of an occupant, said seat bottom having a frame;

a back for holding the torso of an occupant upright, said seat back having a frame;

a housing fixedly attached to said seat back frame and having a channel defined by at least one guide boss;

an extending element having an unanchored weight supporting end and an engaged end slidingly disposed within the channel of said housing; and an actuator fixedly attached to said housing and in moving communication with said extending element;

whereby said actuator mediates the weight supporting end of said extending element between a substantially retracted position and an extended position; and wherein said: housing is fixedly attached to said seat back frame and said housing, said actuator and said extending element comprise a neck support.

3. The seat of claim 2 wherein said housing is fixedly attached to said seat bottom frame and said housing, said actuator and said extending element comprise a thigh support.

4. An ergonomic weight support device for a seat comprising:

A housing having a first channel defined by at least one guide boss and a second channel defined by at least one guide boss;

A first extending element having an unattached weight supporting end and an engaged end slidingly disposed within the first channel of said housing;

A second extending element having an unattached weight supporting end and an engaged end slidingly disposed within the second channel of said housing;

A first actuator fixedly attached to said housing and in moving communication with said first extending element;

A second actuator fixedly attached to said housing and in moving communication with said second extending element;

Whereby said first actuator mediates the weight supporting end of said first extending element between a substantially retracted position and an extended position and said second actuator mediates the weight supporting end of said second extending element between a substantially retracted position and an extended position.

5. An ergonomic weight support device for a seat comprising:

A housing having a first channel defined by at least one guide boss and a second channel defined by at least one guide boss;

A first extending element having an unattached weight supporting end and an engaged end slidingly disposed within the first channel of said housing;

A second extending element having an unattached weight supporting end and an engaged end slidingly disposed within the second channel of said housing, the unattached weight supporting end of said second extending element being bifurcated to form two lateral extensions disposed on opposite sides of the weight supporting surface of said first extending element;

A first actuator fixedly attached to said housing and in moving communication with said first.extending element;

A second actuator fixedly attached to said housing and in moving communication with said second extending element;

Whereby said first actuator mediates the weight supporting end of said first extending element between a substantially retracted position and an extended position and said second actuator mediates the weight supporting end of said second extending element between a substantially retracted position and an extended position.

6. The ergonomic seat support of claim 4 wherein said support is a lumbar support.

7. The ergonomic seat support of claim 4 wherein said support is a head/neck support.

8. The seat of claim 2 further comprising a second housing, second actuator and second extending element comprising a lumbar support.

9. The seat of claim 8 further comprising a third housing, third actuator and third extending element comprising a thigh support.

10. The seat of claim 9 further comprising a fourth housing, fourth actuator and fourth support surface and a fifth housing, fifth actuator and fifth extending element comprising lateral torso supports.

11. The seat of claim 10 further comprising a sixth housing, sixth actuator and sixth extending element and a seventh housing, seventh actuator and seventh extending element comprising lateral thigh supports.

12. The ergonomic support of claim 1 wherein said traction pin is selected from the group consisting of: a wire, a hard drawn wire, a pin, a rod, a bracket and a spoke.

13. The ergonomic support of claim 1 wherein said extending element is comprised of plastic.

14. The ergonomic support of claim 1 wherein said housing is made of plastic.

* * * * *